US012751870B2

(12) United States Patent
Adcock et al.

(10) Patent No.: US 12,751,870 B2
(45) Date of Patent: Oct. 6, 2026

(54) PLINTH MONUMENT AND TABLE

(71) Applicant: B/E Aerospace, Inc., Winston Salem, NC (US)

(72) Inventors: Christopher D. Adcock, Advance, NC (US); Oscar Ruiz Lara, Kirkland, WA (US); Jefferey M. McKee, Duvall, WA (US); Travis John Vaninetti, Bothell, WA (US); Daniel N. Moe, Mukilteo, WA (US); Isaac Hale, Winston Salem, NC (US); Michael Boyd, Walkertown, NC (US); Travis K. Finlay, Durham, NC (US); Shawn William Raybell, DuPont, WA (US)

(73) Assignee: B/E AEROSPACE, INC, Winston-Salem, NC (US)

( * ) Notice: Subject to any disclaimer, the term of this patent is extended or adjusted under 35 U.S.C. 154(b) by 0 days.

(21) Appl. No.: 19/085,971

(22) Filed: Mar. 20, 2025

(65) Prior Publication Data

US 2025/0360032 A1 Nov. 27, 2025

Related U.S. Application Data

(60) Provisional application No. 63/651,823, filed on May 24, 2024.

(51) Int. Cl.
*A61G 3/08* (2006.01)
*B64D 11/00* (2006.01)
*B64D 11/06* (2006.01)

(52) U.S. Cl.
CPC .......... *A61G 3/0808* (2013.01); *B64D 11/003* (2013.01); *B64D 11/0638* (2014.12); *A61G 2220/10* (2013.01)

(58) Field of Classification Search
CPC A61G 3/0808; A61G 2220/10; B64D 11/003; B64D 11/0638
See application file for complete search history.

(56) References Cited

U.S. PATENT DOCUMENTS

| | | | | |
|---|---|---|---|---|
| 4,944,552 | A * | 7/1990 | Harris | B64D 11/0638 297/145 |
| 10,246,191 | B2 | 4/2019 | Schliwa et al. | |
| 10,875,652 | B2 | 12/2020 | Chuang et al. | |
| 10,953,987 | B2 * | 3/2021 | Johnson | B64D 11/0691 |
| 2020/0039626 | A1 * | 2/2020 | Johnson | B64D 11/062 |
| 2020/0354060 | A1 * | 11/2020 | Vaninetti | A47B 31/06 |

(Continued)

FOREIGN PATENT DOCUMENTS

EP 3552963 B1 * 7/2024 ......... B64D 11/0015

*Primary Examiner* — Valentina Xavier
(74) *Attorney, Agent, or Firm* — SNELL & WILMER L.L.P.

(57) ABSTRACT

An aircraft monument may be designed as a multipurpose structure to provide seating amenities to an aircraft passenger using a wheelchair secured to a near-by plinth and to provide services to attendants when the plinth is unoccupied. The aircraft monument may have doors on various sides for access to an internal storage compartment while the plinth is occupied or unoccupied. The aircraft monument may have a table configured to translate between various heights along a sliding rail to provide a meal tray surface to a wheelchair occupant or a standing desk to a standing attendant. The aircraft monument may have storage for the translating table.

20 Claims, 8 Drawing Sheets

(56) References Cited

U.S. PATENT DOCUMENTS

| | | | | |
|---|---|---|---|---|
| 2024/0051666 | A1 | 2/2024 | Moe et al. | |
| 2024/0091083 | A1 | 3/2024 | Moe et al. | |
| 2024/0391591 | A1* | 11/2024 | Moe | A61G 3/0808 |

* cited by examiner

PLINTH MONUMENT AND TABLE

CROSS REFERENCE TO RELATED APPLICATIONS

This application claims the benefit and priority of U.S. Provisional Application No. 63/651,823, entitled "PLINTH MONUMENT AND TABLE," filed on May 24, 2024, which is hereby incorporated by reference in its entirety herein.

TECHNICAL FIELD

The present disclosure relates generally to aircraft storage assemblies and, more particularly, to a plinth and table arrangement.

BACKGROUND

Persons with reduced mobility, such as passengers who use wheelchairs, are usually asked to use airline-provided wheelchairs, to use standard seating, and usually may not use their own wheelchair while they are passengers on an aircraft. Providing a plinth for attaching a personal wheelchair to the floor of an aircraft passenger cabin allows persons of reduced mobility to be aircraft passengers while using personal wheelchairs. However, as the plinth is not necessarily disposed in a standard seating row, the plinth may be deficient in amenities and safety features such as arm rests, oxygen masks, and meal trays. Accordingly, improved systems and methods for a plinth storage monument are desirable.

SUMMARY

According to various embodiments, an aircraft monument is disclosed. In various embodiments, the aircraft monument comprises a storage compartment defined by a forward wall, an aft wall, an aisle wall, and a side wall. In various embodiments, the aircraft monument comprises an aisle storage door disposed on the aisle wall. In various embodiments, the aircraft monument comprises a forward storage door disposed on the forward wall. In various embodiments, the aircraft monument comprises a sliding rail disposed along an edge of the aisle storage door. In various embodiments, the aircraft monument comprises a fold-out table disposed within the storage compartment when in a stowed configuration and configured to translate vertically along the sliding rail when in a deployed configuration.

In various embodiments, the fold-out table of the aircraft monument rotates about a first axis and a second axis to translate from the stowed configuration to the deployed configuration.

In various embodiments, when in the deployed configuration, the fold-out table may translate between a first deployed position and a second deployed position. In various embodiments, the first deployed position is located at a height of between about 20 inches and about 34 inches. In various embodiments, the second deployed position is located at a height of between about 34 inches and about 46 inches.

In various embodiments, each of the heights of the first deployed position and the second deployed position are adjustable.

In various embodiments, the aisle storage door of the aircraft monument includes a first panel and a second panel coupled by a hinge such that the aisle storage door has a folded position and an expanded position, the first panel and the second panel being flush in the expanded position.

In various embodiments, each of the first panel and the second panel of the aircraft monument includes a cleat attachment. In various embodiments, the cleat attachment of each panel may form a continuous cleat attachment when the aisle storage door is in the expanded position.

In various embodiments, when the aisle door is in the expanded position and when the table is in the second deployed position, the table may be coupled to the aisle door via the continuous cleat attachment such that the table prevents the aisle door from rotating.

According to various embodiments, an aircraft monument is disclosed. In various embodiments, the aircraft monument comprises a plinth configured to secure a wheelchair. In various embodiments, the aircraft monument comprises a storage compartment disposed adjacent the plinth and defined by a forward wall, an aft wall, an aisle wall, and a side wall. In various embodiments, the aircraft monument comprises an aisle storage door disposed on the aisle wall and configured to open toward the plinth. In various embodiments, the aircraft monument comprises a forward storage door disposed on the forward wall. In various embodiments, the aircraft monument comprises a sliding rail disposed along an edge of the aisle storage door. In various embodiments, the aircraft monument comprises a fold-out table disposed within the storage compartment when in a stowed configuration and configured to translate vertically along the sliding rail when in a deployed configuration.

In various embodiments, the plinth of the aircraft monument has at least one tie-down. In various embodiments, the storage compartment further comprises a button disposed on at least one wall of the storage compartment configured to activate and to release the at least one tie-down.

In various embodiments, the fold-out table of the aircraft monument has a top surface and a bottom surface. In various embodiments, the fold-out table is configured to rotate from the stowed configuration in which the top surface and the bottom surface are disposed perpendicular to the plinth to the deployed configuration in which the top surface and the bottom surface are disposed parallel to the plinth.

In various embodiments, the deployed configuration comprises a first deployed position located at a height of between about 20 inches and about 34 inches and a second deployed position located at a height of between about 34 inches and about 46 inches.

In various embodiments, at least one shelf of the storage compartment is accessible via the forward storage door while the tie-downs secure the wheelchair to the plinth and at least one shelf of the storage compartment is accessible via the aisle storage door while the plinth is not occupied by a wheelchair.

In various embodiments, the aisle storage door includes a first panel and a second panel coupled by a hinge such that the aisle storage door has a folded position and an expanded position. In various embodiments, the first panel and the second panel are flush in the expanded position. In various embodiments, each of the first panel and the second panel include a cleat attachment. In various embodiments, the cleat attachment of each panel forms a continuous cleat attachment when the aisle storage door is in the expanded position. In various embodiments, when the aisle door is in the expanded position and when the table is in the second deployed position, the table may be coupled to the aisle door via the continuous cleat attachment such that the table prevents the aisle door from rotating.

According to various embodiments, an aircraft with an aircraft monument is disclosed. In various embodiments, the aircraft comprises an aircraft boarding door. In various embodiments, the aircraft comprises a plinth disposed adjacent the aircraft boarding door and configured to secure a wheelchair. In various embodiments, the aircraft comprises a storage compartment disposed adjacent the plinth and defined by a forward wall, an aft wall, an aisle wall, and a side wall. In various embodiments, the aircraft comprises an aisle storage door disposed on the aisle wall and configured to open toward the plinth. In various embodiments, the aircraft comprises a forward storage door disposed on the forward wall.

In various embodiments, the aircraft comprises a sliding rail disposed along an edge of the aisle storage door. In various embodiments, the aircraft comprises a fold-out table disposed within the storage compartment when in a stowed configuration and configured to translate vertically along the sliding rail when in a deployed configuration.

In various embodiments, the plinth of the aircraft has at least one tie-down. In various embodiments, the storage compartment further comprises a button disposed on at least one wall of the storage compartment configured to activate and to release the at least one tic-down.

In various embodiments, the fold-out table has a top surface and a bottom surface. In various embodiments, the fold-out table is configured to rotate from the stowed configuration in which the top surface and the bottom surface are disposed perpendicular to the plinth to the deployed configuration in which the top surface and the bottom surface are disposed parallel to the plinth.

In various embodiments, the deployed configuration comprises a first deployed position located at a height of between 20 inches and 34 inches and a second deployed position located at a height of between 34 inches and 46 inches.

In various embodiments, at least one shelf of the storage compartment is accessible via the forward storage door while the tie-downs secure the wheelchair to the plinth and the at least one shelf of the storage compartment is accessible via the aisle storage door while the plinth is not occupied by a wheelchair.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to "singular" includes plural embodiments, and any reference to "more than one" component or step may include a singular embodiment or step. Also, any reference to "attached," "fixed," "connected," or the like may include permanent, removable, temporary, partial, full or any other possible attachment option. Additionally, any reference to "without contact" (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
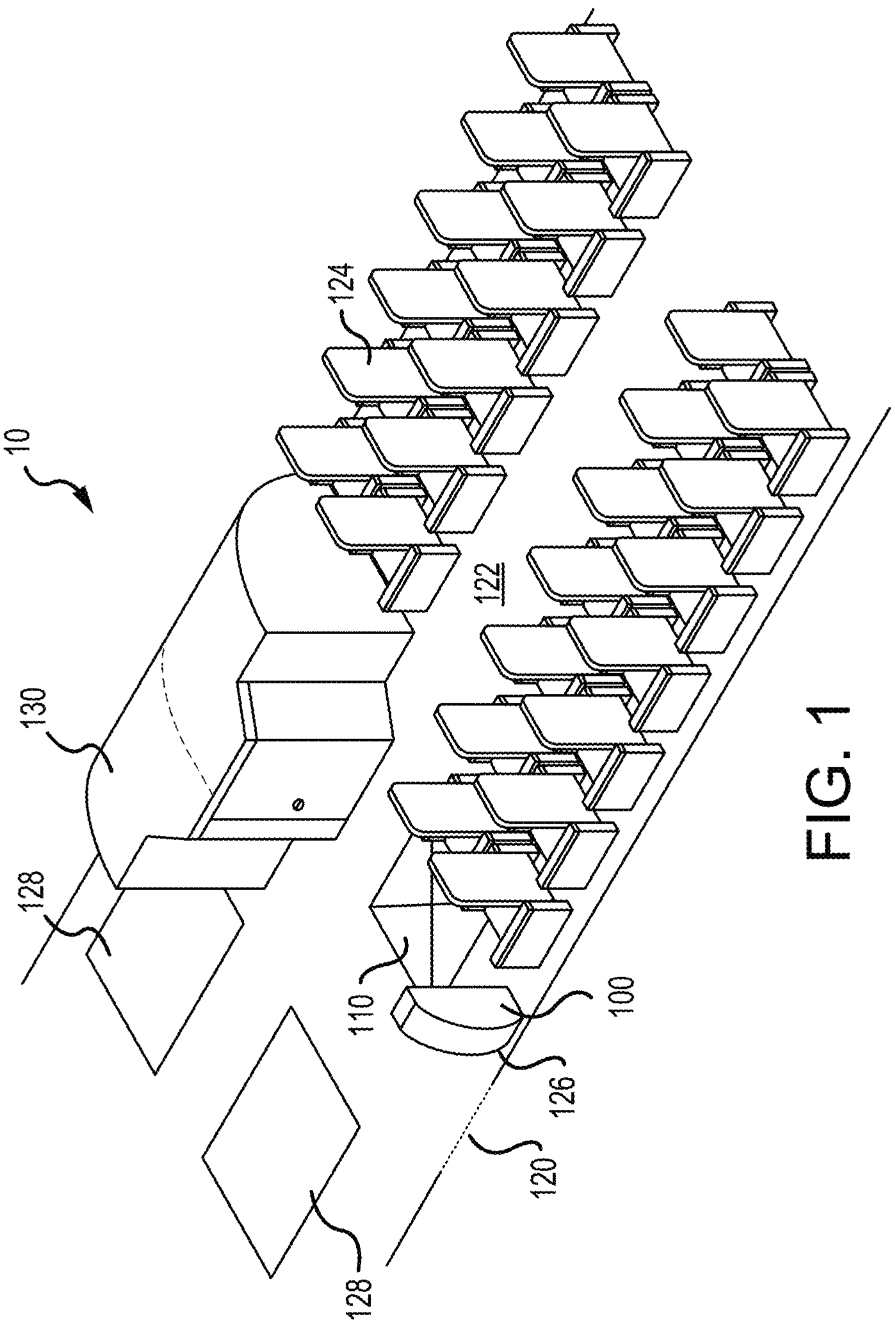
FIG. 1 illustrates an aircraft in accordance with various embodiments.

With reference to FIG. 1, an aircraft cabin 10 is illustrated. In various embodiments, aircraft cabin 10 may have an aircraft monument 100. Aircraft monument 100 may be disposed near a boarding door 120. Aircraft monument 100 may be disposed near a plinth 110 for securing a wheelchair. In various embodiments, and as described herein, aircraft monument 100 may be disposed against a fuselage wall 126. However, it should be understood that aircraft monument 100 may be disposed in any location, such as against the aisle 122 such that the plinth 110 is located between fuselage wall 126 and aircraft monument 100. In various embodiments, aircraft cabin 10 may comprise other features such as passenger seats 124, galley areas 128, or lavatories 130. In various embodiments, aircraft monument 100 may be forward of passenger seats 124 accessible by boarding door 120. In various embodiments, plinth 110 and aircraft monument 100 are the nearest available seating arrangements to boarding door 120.

Figure 2A:
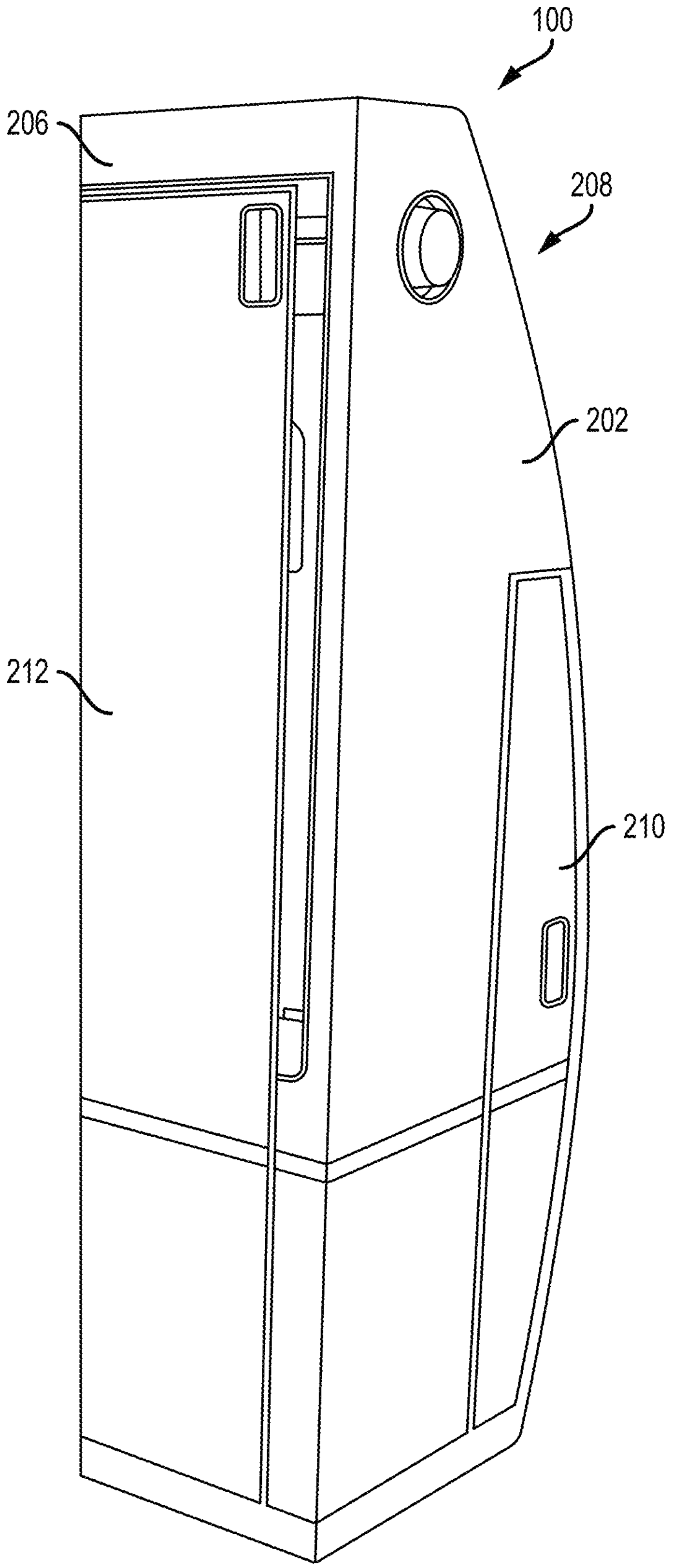
FIGS. 2A and 2B illustrates a front view and a rear view of an aircraft monument, in accordance with various embodiments.
Figure 2B:
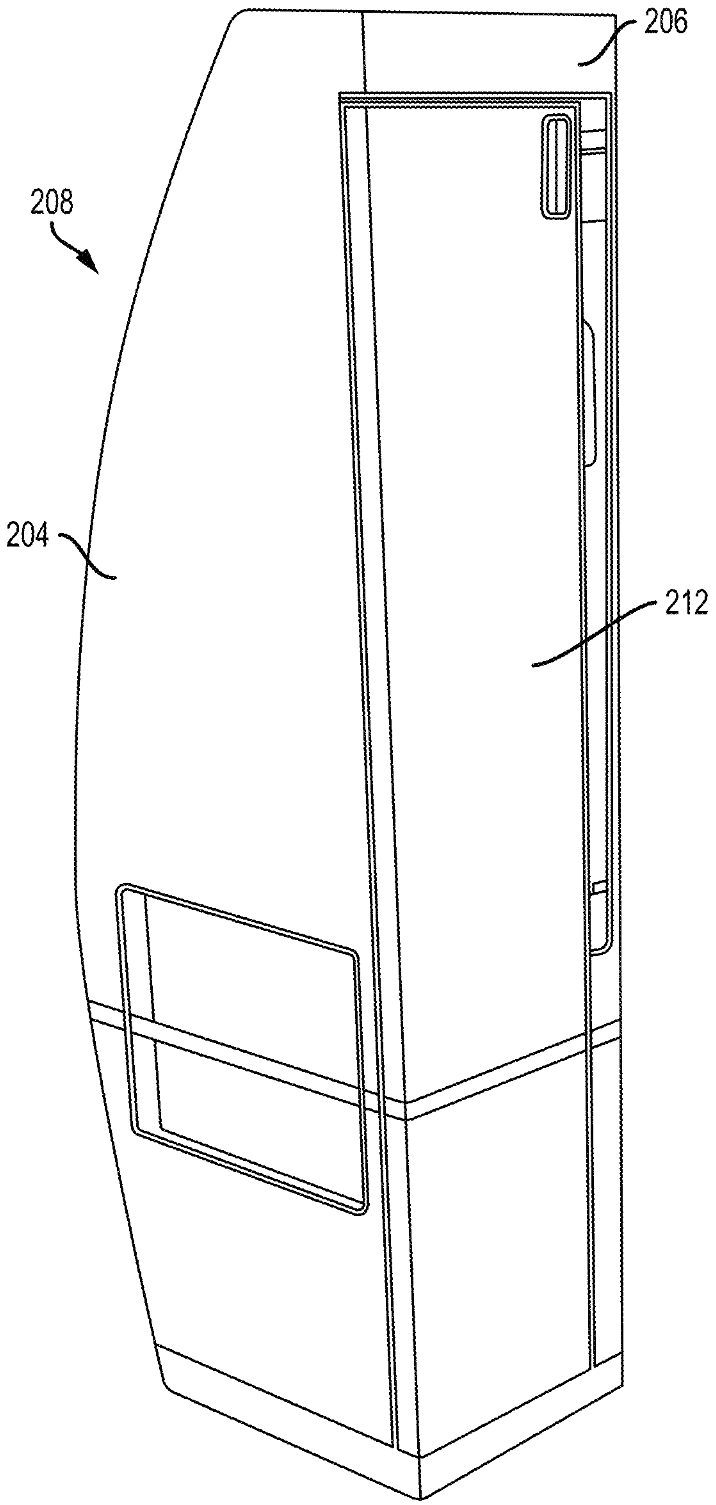

With reference to FIGS. 2A and 2B, aircraft monument 100 is illustrated. In various embodiments, aircraft monument 100 has a forward wall 202, an aft wall 204, an aisle wall 206, and a side wall 208. Although in the embodiments depicted, forward wall 202 faces forward in the aircraft cabin 10, aft wall 204 faces aft in the aircraft cabin 10, aisle wall 206 faces the aisle 122, and side wall 208 faces the fuselage wall 1126, it is again noted that the language of orientation is used for purpose of description and is not limiting. In other words, it is within the present disclosure for the monument to be oriented another way with respect to the aircraft.

In various embodiments, aircraft monument 100 may comprise a forward storage door 210 (also referred to herein as forward door). In various embodiments, aircraft monument 100 may comprise an aisle storage door 212 (also referred to herein as aisle door). In various embodiments, forward storage door 210 may be disposed on the forward wall 202. In various embodiments, aisle storage door 212 may be disposed on aisle wall 206. In various embodiments, aisle storage door 212 opens toward plinth With reference to FIG. 3, aircraft monument 100 may be disposed near a wheelchair plinth 110. In various embodiments, wheelchair plinth 110 may be a multipurpose section of an aircraft which may be, but need not be, used for securing a wheelchair 300 in flight. In various embodiments, wheelchair plinth 110 may comprise tie-downs 304 configured to secure a wheelchair 300. In various embodiments, plinth 110 and tie-downs 304 may be dimensioned to accommodate a standard personal wheelchair 300. Used herein, "standard" means a size that may be larger than typical airport provided wheelchair or a size of wheelchair that does not fit down a typical aircraft aisle. Although a standard wheelchair 300 is discussed, it should be understood that plinth 110 and tie-downs 304 may be dimensioned to accommodate any sized or purposed wheelchair 300.

In various embodiments, aircraft monument 100 may comprise a button 302. Although depicted as disposed on the forward wall 202, button 302 may be disposed on any surface of aircraft monument 100. In various embodiments, button 302 may be configured to control tie-downs 204. In various embodiments, tie-downs 204 are self-tensioning tie-downs. In various embodiments, pressing button 302 may activate or release tie-downs 204. Although referred to as a button, it should be understood that button 302 may be a switch, a touch screen, or any other suitable mechanical or electrical selector for activating and/or releasing tie-downs 304. Although depicted as disposed on the forward wall 202, button 302 may be disposed in any location accessible while wheelchair 300 is occupying plinth 110.

Figure 3:
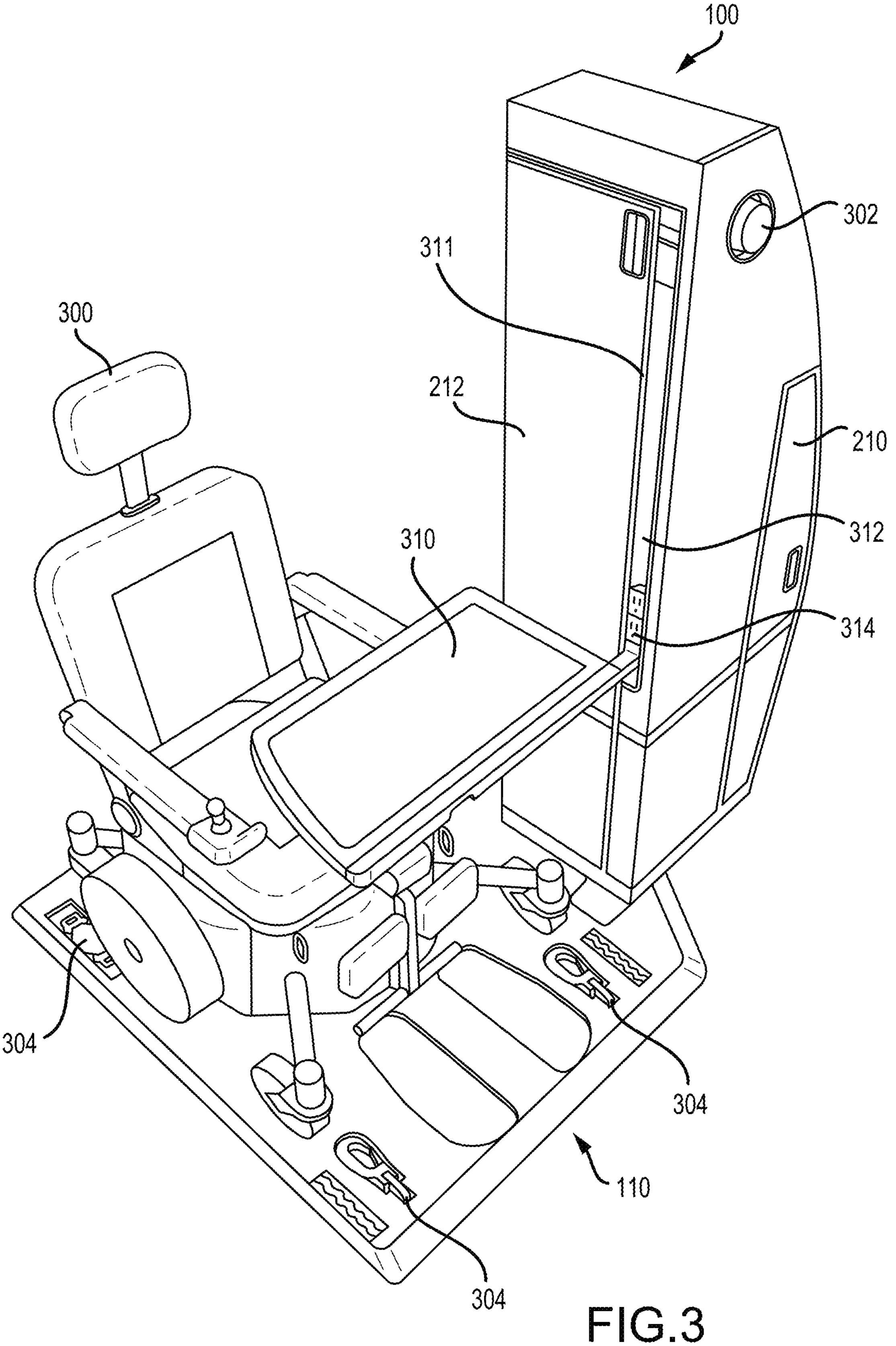
FIG. 3 illustrates an aircraft monument and table in accordance with various embodiments.

With continued reference to FIG. 3, when a wheelchair 300 is occupying plinth 110, aisle door 212 of aircraft monument 100 is configured to be shut and secured. In various embodiments, when a wheelchair 300 is occupying plinth 110, forward door 210 may remain accessible to attendants or passengers. In various embodiments, aircraft monument 100 has a fold-out table 310. Table 310 may stow into a recessed compartment 311 of aircraft monument 100. In various embodiments, to deploy table 310, table 310 may be pivoted from aircraft monument 100 toward wheelchair 300. In this manner, an occupant of wheelchair 300 may use table 310 as a meal tray or support for other activities.

Figure 4:
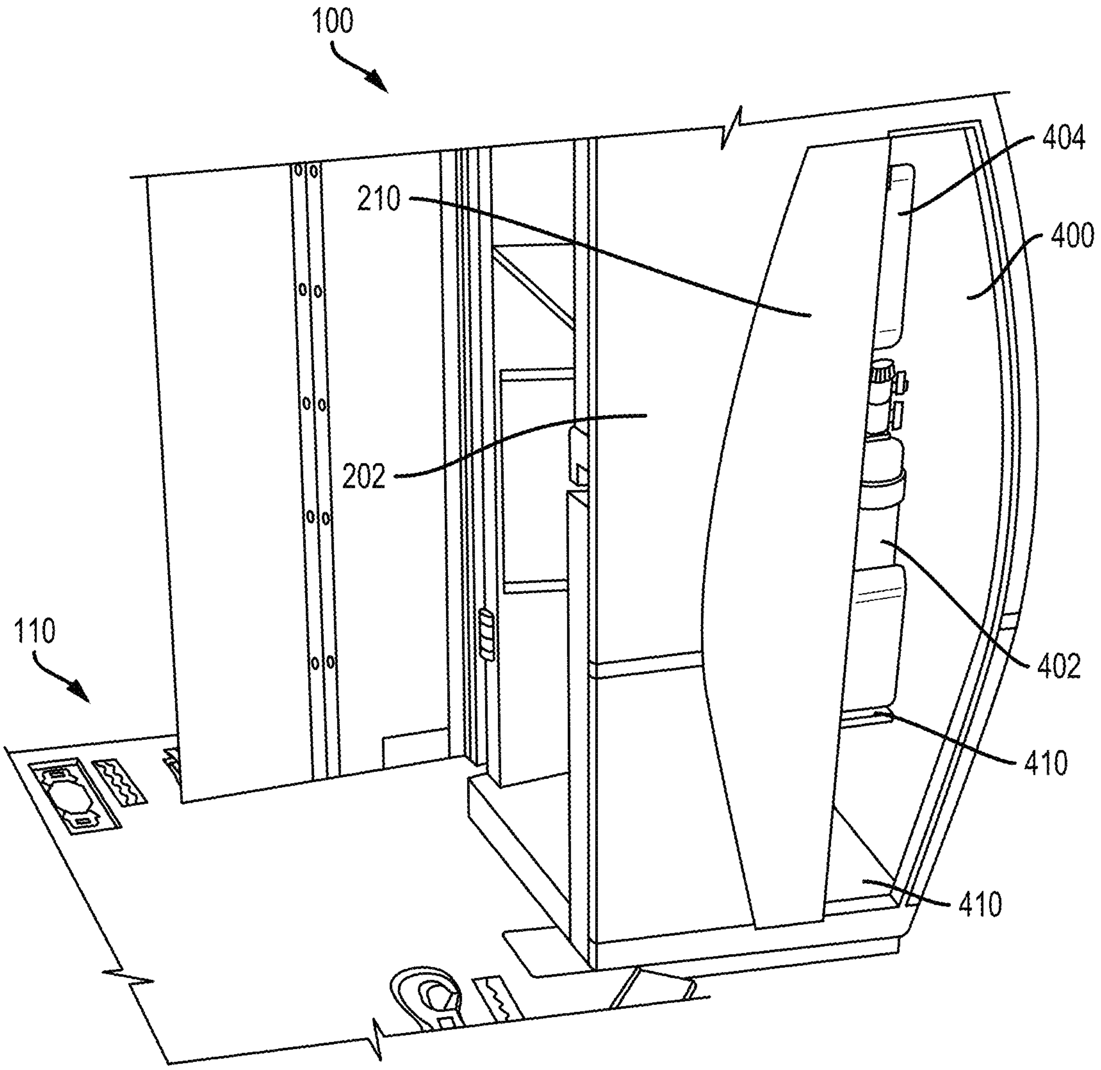
FIG. 4 illustrates an aircraft monument storage compartment in accordance with various embodiments.

With reference to FIG. 4, in various embodiments, forward storage door 210 may be disposed on the forward wall 202 and allow access into a storage compartment 400. In various embodiments, aisle storage door 212 may be disposed on aisle wall 206 and allow access into the storage compartment 400. In various embodiments, whether or not wheelchair 300 is occupying plinth 110, storage compartment 400 is accessible via forward door 210. In various embodiments, storage compartment 400 may have various shelving arrangements 410. In various embodiments, storage compartment 400 may be configured to house emergency equipment such as a oxygen bottles 402 or first aid kit 404. In various embodiments, the emergency equipment is accessible via both forward door 210 and aisle door 212.

Figure 5:
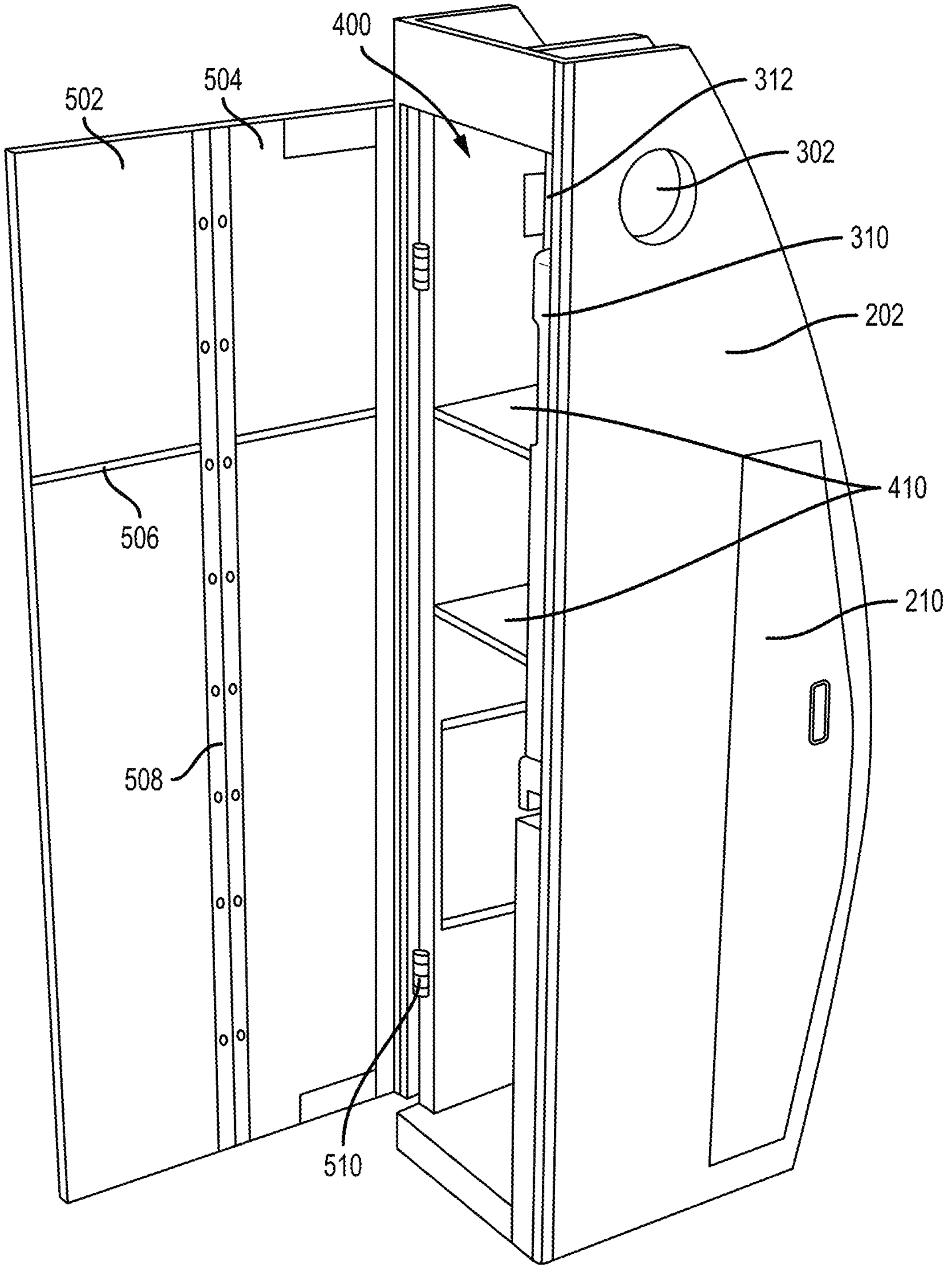
FIG. 5 illustrates an aircraft monument storage compartment and expanded door in accordance with various embodiments.

With reference to FIG. 5, the aisle door 212 of aircraft monument 100 may be a foldable door. In various embodiments, aisle door 212 may have a first panel 502 and a second panel 504. In various embodiments, first panel 502 and second panel 504 rotate with respect to each other about a first hinge 508. In various embodiments, first panel 502 and second panel 504 rotate with respect to aircraft monument 100 about a second hinge 510. First hinge 508 and second hinge 510 may be vertical hinges. In this manner, first panel 502 and second panel 504 may be in a folded configuration when aisle door 212 is closed. In various embodiments, first panel 502 and second panel 504 may remain in the folded position when aisle door 212 is open. In various embodiments, first panel 502 and second panel 504 may be in an expanded configuration when aisle door 212 is open. In the expanded configuration, first panel 502 and second panel 504 may be aligned flush such that first panel 502 and second panel 504 form a single surface.

In various embodiments, aisle door 212 may have a cleat attachment 506. In various embodiments, cleat attachment 506 extends across first panel 502 and second panel 504.

Figure 6:
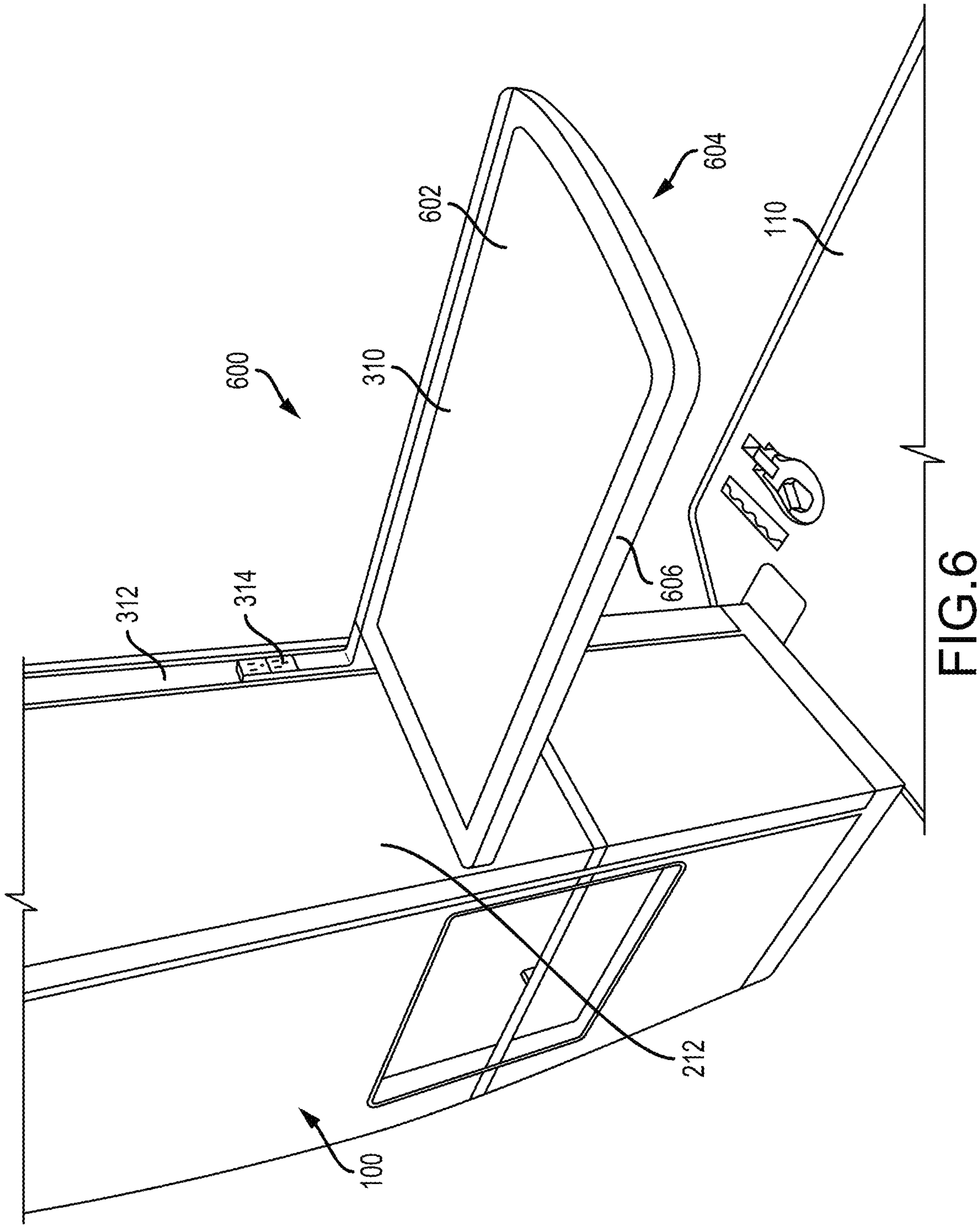
FIG. 6 illustrates an aircraft monument and table in accordance with various embodiments.

With reference to FIG. 6, a first deployed position 600 of table 310 is illustrated. In various embodiments, table 310 has a top surface 602 and an opposing bottom surface 604. In various embodiments, top surface 602 is configured to be a workspace surface such as a meal tray, a tray for resting books or other objects, or a meal preparation surface. In various embodiments, and with brief reference to FIG. 3, table 310 may be at a first height when in the first deployed position 600. In the first deployed position 600, table 310 may be configured to secure parallel to the floor (or perpendicular to the aisle wall). In the first deployed position 600, table 310 may be configured to be at about the height of a seated occupant of wheelchair 300. For example, the first deployed position 600 may be disposed at a height from about 20 inches (45.5 cm) to about 34 inches (86.5 cm) or from about 22 inches (70 cm) to about 26 inches (74 cm), wherein the term "about" in this context only means +/−1 inch (+/−2.5 cm). In the first deployed position, table 310 may be configured to be disposed over the lap of a seated occupant of wheelchair 300. In this manner, table 310 may may be used as a meal tray or other surface by the seated occupant of wheelchair 300.

In various embodiments, table 310 may comprise a cleat receiver 606. In various embodiments, cleat receiver 606 may be an L-shaped edge which rests upon cleat attachment 506. In various embodiments, cleat receiver 606 may be a beveled edge which mates with cleat attachment 506.

In various embodiments, the recessed compartment 311 may have various charging ports 314. Charging ports 314 may be for any adapter configuration. For example, charging ports may be configured to receive various international AC adapter arrangements, USB adapters, or any other type of port configured to transfer power and/or data. In various embodiments, charging ports 314 are accessible when table 310 is deployed, when table 310 is secured within recessed compartment 311, or regardless of table 310's orientation.

Figure 7:
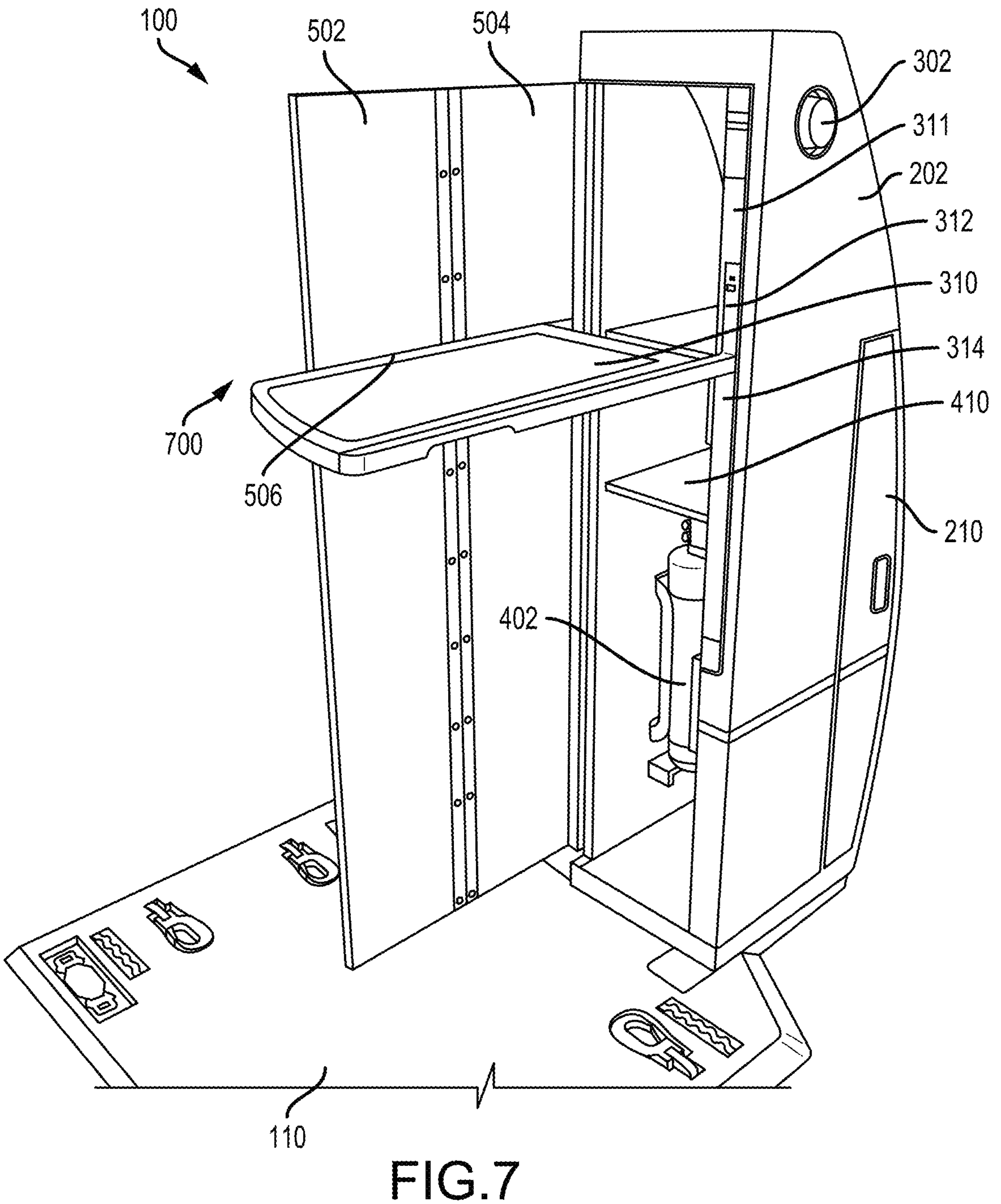
FIG. 7 illustrates an aircraft monument and table in accordance with various embodiments.

With reference to FIG. 7, a second deployed position 700 of table 310 is illustrated. In various embodiments, table 310 may be at a second height when in the second deployed position 700. In the second deployed position 700, table 310 may be configured to secure parallel to the floor (or perpendicular to the aisle wall). In the second deployed position 700, table 310 may be configured to attach to aisle door 212 via cleat attachment 506. In this manner, table 310 may support aisle door 212 and secure aisle door 212 from further rotation with respect to aircraft monument 100. In the second deployed position 700, table 310 may be configured to be at about the height of a standing person, such as a flight attendant. For example, the second deployed position 700 may be disposed at a height of from about 34 inches (86.5 cm) to about 46 inches (132 cm) or from about 40 (96.5 cm)

to about 44 inches (117 cm). In the second deployed position 700, table 310 may be configured to be used as a meal preparation surface or other surface by the standing attendant. For example (not shown), a cart may be secured at plinth 110 beneath table 310 in the second deployed position 700.

With reference to FIGS. 3, 5, 6, and 7, recessed compartment 311 may comprise a sliding rail 312. In various embodiments, sliding rail 312 is configured to allow table 310 to translate vertically between first deployed position 600 and second deployed position 700. In various embodiments, a lock 318 locks table 310 into a position parallel to the floor. In various embodiments, lock 318 may be secured at various stepped or discontinuous positions along sliding rail 312. In various embodiments, lock 318 may be secured at any continuous position along sliding rail 312. In this manner, it is understood that the heights of both first deployed position 600 and second deployed position 700 are adjustable such that the table 310 can be secured at a height to accommodate various individuals who themselves have different lap heights or who are taller/shorter.

Finally, it should be noted that while this disclosure is directed primarily to aircraft monuments, that the concepts described above can also be applied to monuments for use in other transportation vehicles such as trains or ships. For example, aircraft monument 100 can be used as a monument for a wheelchair plinth on a train car or for a wheelchair plinth on a cruise ship.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the specification or claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft monument, comprising:

a storage compartment defined by a forward wall, an aft wall, an aisle wall, and a side wall;

an aisle storage door disposed on the aisle wall;

a forward storage door disposed on the forward wall;

a sliding rail disposed along an edge of the aisle storage door; and a fold-out table disposed within the storage compartment when in a stowed configuration and configured to translate vertically along the sliding rail when in a deployed configuration.

2. The aircraft monument of claim 1, wherein the fold-out table rotates about a first axis and a second axis to translate from the stowed configuration to the deployed configuration.

3. The aircraft monument of claim 1, wherein in the deployed configuration the fold-out table may translate between a first deployed position and a second deployed position.

4. The aircraft monument of claim 3, wherein the first deployed position is located at a height of between about 20 inches and about 34 inches.

5. The aircraft monument of claim 4, wherein the second deployed position is located at a height of between about 34 inches and about 46 inches.

6. The aircraft monument of claim 5, wherein each of the heights of the first deployed position and the second deployed position is adjustable.

7. The aircraft monument of claim 5, wherein the aisle storage door includes a first panel and a second panel coupled by a hinge such that the aisle storage door has a folded position and an expanded position, the first panel and the second panel being flush in the expanded position.

8. The aircraft monument of claim 7, wherein each of the first panel and the second panel includes a cleat attachment, the cleat attachment of each panel forming a continuous cleat attachment when the aisle storage door is in the expanded position.

9. The aircraft monument of claim 8, wherein when the aisle door is in the expanded position and when the table is in the second deployed position, the table may be coupled to the aisle door via the continuous cleat attachment such that the table prevents the aisle door from rotating.

10. An aircraft monument, comprising:

a plinth configured to secure a wheelchair;

a storage compartment disposed adjacent the plinth and defined by a forward wall, an aft wall, an aisle wall, and a side wall;

an aisle storage door disposed on the aisle wall and configured to open toward the plinth;

a forward storage door disposed on the forward wall;

a sliding rail disposed along an edge of the aisle storage door; and a fold-out table disposed within the storage compartment when in a stowed configuration and configured to translate vertically along the sliding rail when in a deployed configuration.

11. The aircraft monument of claim 10, wherein the plinth has at least one tie-down and wherein the storage compartment further comprises a button disposed on at least one wall of the storage compartment configured to activate and to release the at least one tie-down.

12. The aircraft monument of claim 10, wherein the fold-out table has a top surface and a bottom surface, and wherein the fold-out table is configured to rotate from the stowed configuration in which the top surface and the bottom surface are disposed perpendicular to the plinth to the deployed configuration in which the top surface and the bottom surface are disposed parallel to the plinth.

13. The aircraft monument of claim 12, wherein the deployed configuration comprises a first deployed position located at a height of between about 20 inches and about 34 inches and a second deployed position located at a height of between about 34 inches and about 46 inches.

14. The aircraft monument of claim 13, wherein at least one shelf of the storage compartment is accessible via the forward storage door while the tie-downs secure the wheelchair to the plinth and wherein the at least one shelf of the storage compartment is accessible via the aisle storage door while the plinth is not occupied by a wheelchair.

15. The aircraft monument of claim 13, wherein the aisle storage door includes a first panel and a second panel coupled by a hinge such that the aisle storage door has a folded position and an expanded position, the first panel and the second panel being flush in the expanded position, wherein each of the first panel and the second panel includes a cleat attachment, the cleat attachment of each panel forming a continuous cleat attachment when the aisle storage door is in the expanded position, and wherein when the aisle door is in the expanded position and when the table is in the second deployed position, the table may be coupled to the aisle door via the continuous cleat attachment such that the table prevents the aisle door from rotating.

16. An aircraft, comprising:

an aircraft boarding door;

a plinth disposed adjacent the aircraft boarding door and configured to secure a wheelchair;

a storage compartment disposed adjacent the plinth and defined by a forward wall, an aft wall, an aisle wall, and a side wall;

an aisle storage door disposed on the aisle wall and configured to open toward the plinth;

a forward storage door disposed on the forward wall;

a sliding rail disposed along an edge of the aisle storage door; and a fold-out table disposed within the storage compartment when in a stowed configuration and configured to translate vertically along the sliding rail when in a deployed configuration.

17. The aircraft of claim 16, wherein the plinth has at least one tie-down and wherein the storage compartment further comprises a button disposed on at least one wall of the storage compartment configured to activate and to release the at least one tie-down.

18. The aircraft of claim 16, wherein the fold-out table has a top surface and a bottom surface, and wherein the fold-out table is configured to rotate from the stowed configuration in which the top surface and the bottom surface are disposed perpendicular to the plinth to the deployed configuration in which the top surface and the bottom surface are disposed parallel to the plinth.

19. The aircraft of claim 16, wherein the deployed configuration comprises a first deployed position located at a height of between 20 inches and 34 inches and a second deployed position located at a height of between 34 inches and 46 inches.

20. The aircraft of claim 16, wherein at least one shelf of the storage compartment is accessible via the forward storage door while the tie-downs secure the wheelchair to the plinth and wherein the at least one shelf of the storage compartment is accessible via the aisle storage door while the plinth is not occupied by a wheelchair.

* * * * *